May 15, 1956   J. J. GENET   2,745,395
DEVICE FOR CONTROLLING THE OPENING AND CLOSING
OF THE CYLINDERS OF COMBUSTION ENGINES
Filed April 22, 1953   3 Sheets-Sheet 1

Inventor
Joseph Jean Genet

Karl W. Flocks
Attorney

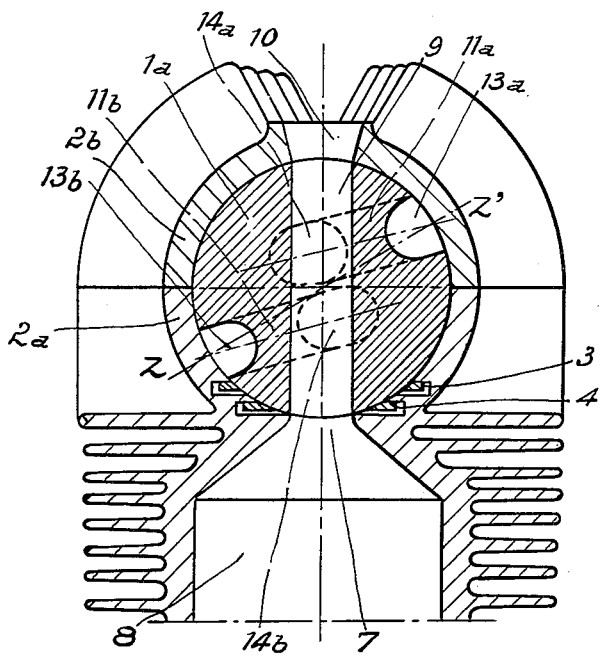
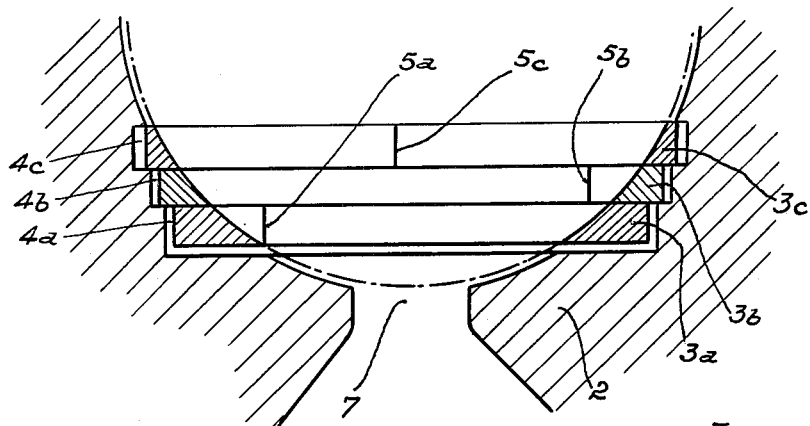

May 15, 1956   J. J. GENET   2,745,395
DEVICE FOR CONTROLLING THE OPENING AND CLOSING
OF THE CYLINDERS OF COMBUSTION ENGINES
Filed April 22, 1953   3 Sheets-Sheet 3

Inventor
Joseph Jean Genet

Karl W. Flocks
Attorney

United States Patent Office 2,745,395
Patented May 15, 1956

2,745,395

DEVICE FOR CONTROLLING THE OPENING AND CLOSING OF THE CYLINDERS OF COMBUSTION ENGINES

Joseph Jean Genet, Paris, France

Application April 22, 1953, Serial No. 350,429

Claims priority, application France August 10, 1948

4 Claims. (Cl. 123—190)

The present application is a continuation-in-part of copending application Serial No. 104,226, filed July 12, 1949, now abandoned.

The present invention relates to an internal combustion engine and more particularly to a device for closing and opening the inlet and exhaust ports of the cylinder of an internal combustion engine, and to the sealing means therefor.

The device according to the invention is essentially characterized by the fact that it comprises a housing which opens into the chamber of the cylinder and inside which is mounted a valve of spherical shape, which is adapted to be driven, in any suitable manner, with a continuous rotary movement synchronized with that of the engine, and in which are provided ducts which place the cylinder selectively and successively in communication with the inlet and the exhaust of the engine during a predetermined angle of rotation, the fluid-tightness of the closure of the cylinder being obtained by the combination of the use of the spherical shape of the valve with the use of packing rings inserted in grooves provided in the portion of the housing which is secured to the cylinder head.

An object of the present invention is to provide a rotary valve or distributor which is characterized by the use of a special sealing device having resilient rings and of a special arrangement of inlet and exhaust ducts for the distributor.

Another object of the present invention is to provide a rotary valve actuated by a shaft which is secured thereto and which is adapted to rest on suitable recesses which form bearings and which are provided in the housing along the axis of rotation of the valve.

Still another object of the present invention is to provide a spherical type of distributor valve rotating inside a housing constituted by at least two parts, one of which is integral with the engine head and the fluid tightness of which is insured by means of sealing rings placed concentrically in relation to the communication orifice of the engine cylinder within grooves formed in the part of the housing integral with the head.

Other objects and the nature and advantages of the instant invention will be apparent from the following description taken in conjunction with the accompanying drawings, wherein:

Fig. 2 is an enlarged vertical sectional view of another form of the sealing means embodied in the present invention;

Fig. 6 is a section taken along the line 6—6 of Fig. 5;

Figure 3:
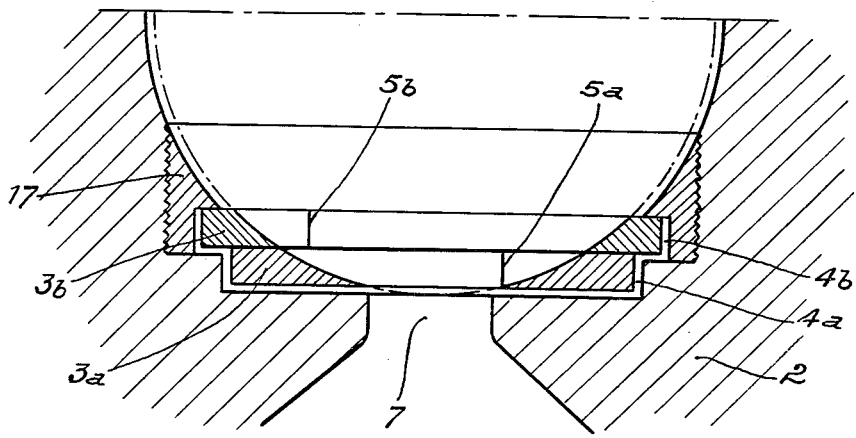
Fig. 3 is a vertical sectional view of another form of sealing means provided in the present invention.
Figure 7:
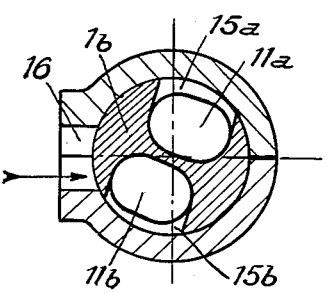
Fig. 7 is a section taken along the line 7—7 of Fig. 5.
Figure 5:
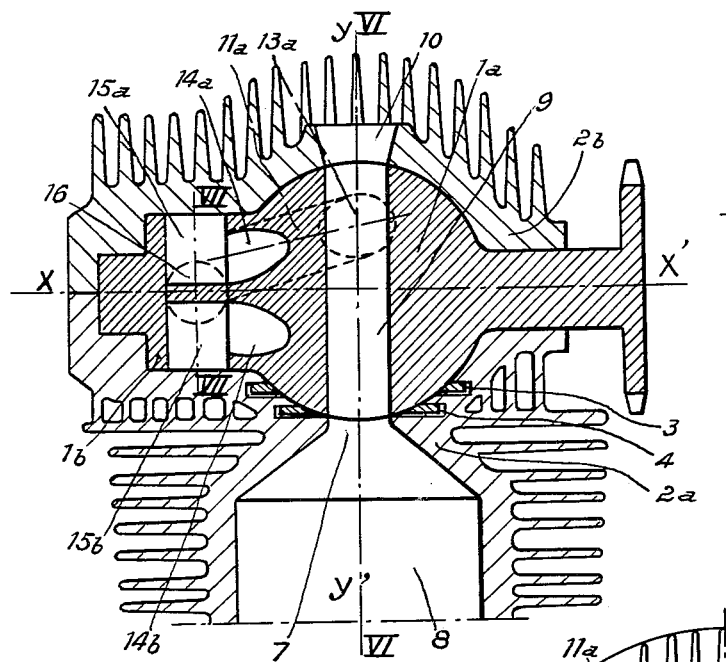
Fig. 5 is an axial longitudinal section of the rotary valve embodied in the present invention for use in an air-cooled single cylinder engine.
Figure 8:
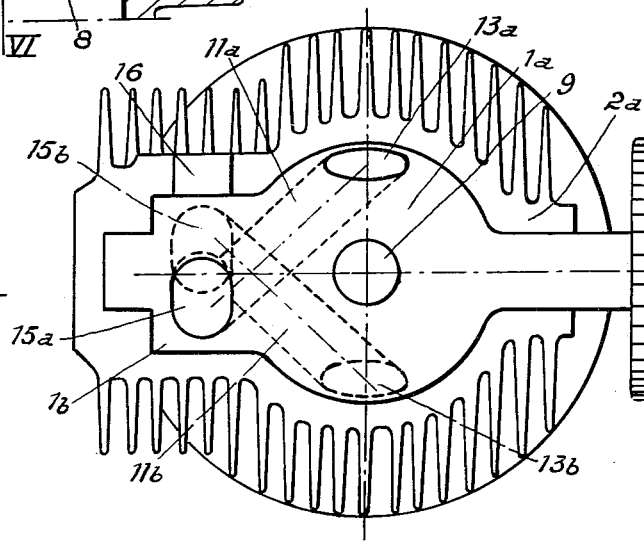
Fig. 8 is a plan view of the rotary valve illustrated in Fig. 5.
Figure 4:
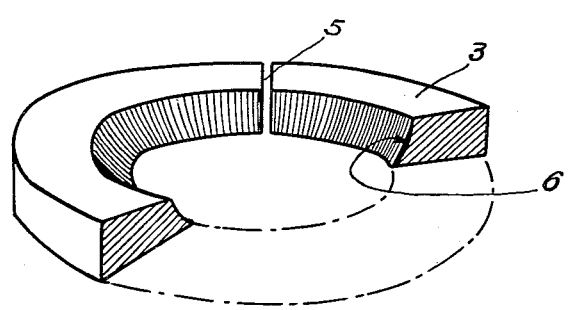
Fig. 4 is a perspective view of an individual sealing ring showing parts in section.

Referring to the drawings, and particularly Figs. 1–4, the fluid-tightness between the body 1 of the rotating distributor and the communication orifice 7 of the engine cylinder is assured by means of specially shaped rings such as ring 3 shown in Fig. 3, which are arranged within grooves 4 provided in the housing 2 of the distributor.

The sealing rings are made of a resilient metal and assume the general shape of rings 3 split at 5. The section through the said rings may either be of trapezoidal shape (such as the rings 3a and 3b of Figs. 2 and 3) or of triangular shape (such as the ring 3c of Fig. 2), the edge 6 of said section which must contact the distributor being curved so as to snugly fit the outer shape of the latter. In the case of a spherical distributor, the edge 6 of the ring section will be the arc of a circle.

The rings 3 are arranged within fixed, circular grooves 4 provided in the part of the housing 2 integral with the engine head, concentrically to the orifice 7 communicating with the cylinder. The grooves 4 have a trapezoidal section corresponding to that of the rings which they contain.

The sealing rings 3 are so designed that, in the position of rest, they slightly overlap their grooves 4 within the housing 2 in such a way that, when the sealing body or valve 1 is disposed in its housing, the rings open out slightly due to the split portion thereof and their resiliency, and tend to press constantly against the sealing body 1, thus assuring perfect contact and, consequently, absolute fluid-tightness. The dimension of the grooves 4 which receive the rings 3 are slightly greater than those of the rings so that the latter may move freely in their housings.

In view of the special arrangements explained above, the pressure exerted by the gases at the moment of explosion results in the ring pressing still more against the body of the distributor and, consequently, in an increase of the fluid-tightness at the very moment when the latter must be the most perfect.

Figure 1:
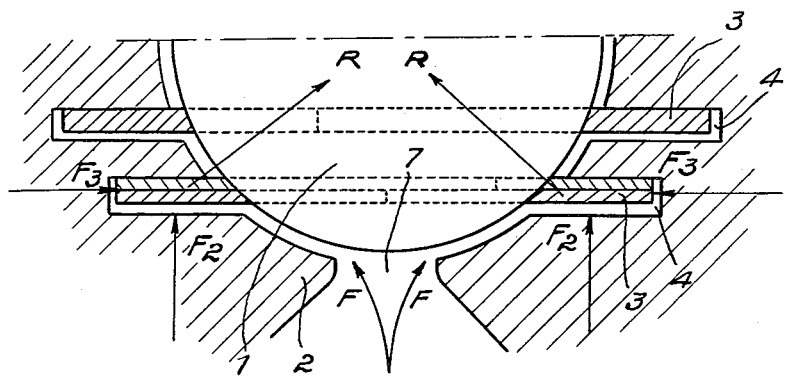
Fig. 1 is an enlarged vertical sectional view of one form of the sealing means embodied in the present invention.

Referring to Fig. 1, it will be seen that the gases which tend to escape in the direction of the arrows F flow into the cavity 4, where they then freely exert on the inner face and outer face of the ring 3 (or of the two rings placed one above the other in the same groove), respective thrusts $F_2$ and $F_3$ having a resultant R which forces the ring against the distributor or valve all the more energetically as the pressure is the stronger. In order to increase the efficiency of the sealing device, one of the following solutions may advantageously be adopted:

In order to carry to a maximum the efficiency of the said sealing system, there must necessarily be at least two rings placed one directly above the other so that the splits 5a, 5b be in staggered relation one with the other; this assures a condition of continuity of contact over the whole of the periphery of the spherical part 1a on which rest the rings.

In order to easily mount the rings within their grooves, the latter exhibit a triangular or stepped shape 4a, 4b, 4c (see Figs. 2 and 3), the upper ring being held in place, either (Fig. 3) by means of a securing washer 17 which screws into a suitable threading provided in the housing mass 2, or (Fig. 2) by giving the said upper ring a substantially triangular section. As a variant, there may be provided (Fig. 1) several concentric grooves 4 arranged one above the other and within which are housed one or more rings 3.

The sealing device described hereinabove has appreciable advantages, namely: great efficiency since the fluid-tightness is at a maximum at the moment of the working stroke; great simplicity in manufacture and adjustment, in mounting and dismounting, in particular, by using several rings arranged in a single groove of triangular section; virtual impossibility of jamming of the rings against the wall of the distributor due to the fact that, in view of the shape of the said rings and their position relative to the distributor, the elastic forces which enter into action are exerted in a plane parallel to the plane of the communication opening of the engine cylinder; and practically fool-proof during operation.

Referring now to Figs. 5-8, the special arrangement of the inlet and exhaust ducts is illustrated. According to the embodiment shown by way of example in the drawings, the rotary valve is a metallic mass and comprises a spherical part 1a and a cylindrically shaped extension 1b, the whole rotating within a two-part housing 2a and 2b, one part 2a being integral with the cylinder head 8. It is in this latter part of the housing that are provided the grooves 4 containing the rings 3 concentric with the communication orifice 7. A duct 10, which, in the example shown, is cylindrical and rectilinear, is arranged in the great circle of the spherical part 1 contained in a plane perpendicular to the axis of rotation XX' of the rotary valve; it allows the cylinder 8 to be connected with the exhaust 10, through the communication orifice 7 provided in the cylinder head. In the example shown, this connection with the exhaust takes place when the duct 9 is in the YY' axis of the cylinder 8, the said condition being realized when the axis of rotation of the rotary valve is perpendicular to the axis YY' of the cylinder 8 and intersects the extension of the said axis.

By this specific arrangement the cylinder 8 is put in communication with the fixed exhaust orifice 10 twice for each complete rotation of the distributor and so that the distribution is effected for two engine cycles.

In view of this last consequence, there are provided in the body of the rotary valve two preferably rectilinear and cylindrical inlet ducts 11a and 11b which are arranged symmetrically in relation to the axis of rotation XX' of the distributor and offset at an angle of 180° one with respect to the other. Two of the ends 13a and 13b of the said ducts issue along the great circle of the sphere 1a, which is contained in a plane perpendicular to the axis of rotation XX' and along which also issue the openings of the exhaust duct 9, the spaces between the openings of the exhaust ducts and the inlet ducts being determined in terms of the engine setting. The other ends 14a and 14b of the ducts 11a and 11b issue into ducts 15a and 15b provided in the cylindrical part 1b of the rotary valve, symmetrically relative to the axis of rotation XX'. The said ducts 15a and 15b during the rotation of the rotary valve, come successively opposite the fixed inlet orifice 16. The object of this latter arrangement is to render the spherical rotary valve more fluid-tight due to the fact that only one of the ends of the ducts 11a and 11b is situated in the spherical part 1a.

The section of the ducts, both exhaust and inlet, is preferably circular. The diameter thereof is determined by the conditions of adjustment of the engine and, in particular, of the period of time fixed for the inlet and the exhaust. The said ducts may have an oblong section if the adjustment conditions of the engine cannot be carried out with a circular section.

It will at once be seen that when the rotary valve is continuously rotated about its axis XX', it places the cylinder 8 twice per rotation successively in communication with the inlet orifice 16 and the exhaust orifice 10 of the engine, through the orifice 7 of the duct 9 and the ducts 11a and 11b.

The result is that, for an explosion engine operating on a four-stroke cycle, it is sufficient to rotate the rotary valve at a quarter of the speed of rotation of the engine crankshaft. For an engine operating on a two-stroke cycle, the rotary valve must rotate half as rapidly as the engine crankshaft.

Moreover, it is obvious that if, for the clearness of the description, there has been described and shown a rotary valve for a single cylinder engine, the invention applies just as well and with the same advantages to multi-cylinder engines.

It is apparent that the arrangement of the rotary valve provides great rigidity, reducing the deformations under the action of the heat to which it is subjected; the metallic mass of the rotary valve constitutes a heat "fly-wheel" assuring a better distribution of the temperatures; perfect equilibrium of the rotary valve results from its symmetry relative to its axis of rotation; more satisfactory discharge of the burnt gases in view of the straightness of the exhaust duct and its position relative to the cylinder resulting in less heating is achieved and, comparatively with a valve engine of equal cylinder displacement, an increase in power and efficiency is effected. Moreover, the rotary valve provides a lower speed of rotation which results in better conditions of use and greater lubricating efficiency and, in addition, there is the possibility of easy adaptation to multi-cylinder engines with possible reduction of the fixed inlet orifices of the engine.

It will be obvious to those skilled in the art that various changes may be made without departing from the spirit of the invention and, therefore, the invention is not limited to what is shown in the drawings and described in the specification, but only as indicated in the appended claims.

What is claimed is:

1. In a rotary distributor for an internal combustion engine, a housing, a rotary distributor body disposed within said housing, and a sealing device positioned between said distributor body and said housing for sealing said distributor body from said housing against gases escaping from an orifice, said orifice being located adjacent said distributor body and housing, said sealing device including a groove of substantially triangular section formed in said housing, said groove being formed with slots in stepped relation, slit resilient rings positioned in said slots in constant contact with said distributor body, said rings each having a face of part spherical shape, the rings nearest said orifice having a trapezoidal cross section, the rings furtherest away from said orifice having a substantially triangular cross section, said rings being adapted to move in their respective slots so that gases escaping from the orifice which filter into a small space provided between the rings and end of the slots will force said rings against the distributor body.

2. In a rotary distributor for an internal combustion engine, a housing, a rotary distributor body disposed within said housing, and a sealing device positioned between said distributor body and said housing for sealing said distributor body from said housing against gases escaping from an orifice, said orifice being located adjacent said distributor body and housing, said sealing device including a groove which is step-shaped in cross section and in which are positioned slit resilient rings, said rings being in constant contact with said distributor body, the rings which are nearest to said orifice having a face of part spherical shape and a section having the shape of a trapezium, the rings furtherest away from said orifice having a section of substantially triangular shape, said rings being adapted to move in said groove so that gases escaping from said orifice which filter into a small space provided between the rings and the end of said groove force said rings against said distributor body.

3. In a rotary distributor for an internal combustion engine, a housing, a rotary distributor body disposed within said housing, and a sealing device positioned between said distributor body and said housing for sealing said distributor body from said housing against gases escaping from an orifice, said orifice being located adjacent said distributor body and housing, said sealing device including a groove of substantially triangular section, a ring positioned in said groove in constant contact with said distributor body, said ring having a face of part spherical shape and a section of substantially triangular shape, said ring being adapted to move in said groove so that gases escaping from said orifice which filter into a small space provided between said ring and the end of said groove will force said ring against said distributor body.

4. In a rotary distributor for an internal combustion engine, a housing, a rotary distributor body disposed within said housing, and a sealing device positioned between said distributor body and said housing for sealing said distributor body from said housing against gases escaping from an orifice, said orifice being located adjacent said distributor body and housing, said sealing device including a groove, a ring positioned in said groove having a face of part spherical shape and being in constant contact with said distributor body, said ring being secured in place by a securing washer, said securing washer engaging a screw thread formed on said engine housing, said ring being adapted to move in said groove so that gases escaping from said orifice will filter into a small space provided between said ring and the end of said groove and force said ring against said distributor body.

References Cited in the file of this patent

UNITED STATES PATENTS

| | | |
|---|---|---|
| 1,128,757 | Chandler | Feb. 16, 1915 |
| 1,139,101 | Chandler | May 11, 1915 |
| 1,671,254 | Porter | May 29, 1928 |

FOREIGN PATENTS

| | | |
|---|---|---|
| 454,938 | France | May 8, 1913 |